(12) United States Patent
Song et al.

(10) Patent No.: US 8,311,784 B2
(45) Date of Patent: Nov. 13, 2012

(54) METHOD FOR DESIGNING CONCENTRIC AXIS DOUBLE HOT GAS DUCT FOR VERY HIGH TEMPERATURE REACTOR

(75) Inventors: Kee-Nam Song, Daejeon (KR);
Yong-Wan Kim, Daejeon (KR);
Jong-Wha Chang, Daejeon (KR);
Won-Jae Lee, Daejeon (KR)

(73) Assignee: Korea Atomic Energy Research Institute, Daejeon-si (KR)

( * ) Notice: Subject to any disclaimer, the term of this patent is extended or adjusted under 35 U.S.C. 154(b) by 126 days.

(21) Appl. No.: 12/997,389

(22) PCT Filed: Mar. 3, 2009

(86) PCT No.: PCT/KR2009/001047
§ 371 (c)(1),
(2), (4) Date: Dec. 10, 2010

(87) PCT Pub. No.: WO2010/044518
PCT Pub. Date: Apr. 22, 2010

(65) Prior Publication Data
US 2011/0098995 A1 Apr. 28, 2011

(30) Foreign Application Priority Data
Oct. 14, 2008 (KR) .......... 10-2008-0100510

(51) Int. Cl.
*G06F 17/50* (2006.01)
*G06F 7/60* (2006.01)
*G06G 7/48* (2006.01)
*G06G 7/56* (2006.01)
*G06G 7/50* (2006.01)
*G06G 7/58* (2006.01)

(52) U.S. Cl. .......... 703/2; 703/1; 703/6; 703/7; 703/8; 703/9; 703/10; 703/11; 703/12

(58) Field of Classification Search .......... 703/1, 2, 703/6–12
See application file for complete search history.

(56) References Cited

U.S. PATENT DOCUMENTS
4,643,866 A * 2/1987 Thornton et al. .......... 376/245
(Continued)

FOREIGN PATENT DOCUMENTS
CA 2434997 1/2004
(Continued)

OTHER PUBLICATIONS

Huang et al. "Design and experiment of hot gas duct for the HTR-10", Nuclear Engineering and Design 218 (2002) 137-145.*

(Continued)

*Primary Examiner* — Shambhavi Patel
(74) *Attorney, Agent, or Firm* — H.C. Park & Associates, PLC (57) ABSTRACT

Provided is a method of designing a coaxial dual-tube type hot gas duct for a very-high-temperature reactor. When determining the outer diameter of an inner tube and the inner diameter of a pressure tube, both of which defines an annular part of the hot gas duct having a dual-tube shape, one selected from hydraulic heads, flow rates, and hydraulic heads of very-high-temperature helium gas flowing to a very-high-temperature region and low-temperature helium gas flowing to a low-temperature region is taken into consideration as well as is a relation of about heat balance model, so that it is possible to minimize flow induced vibrations caused by the flow of a fluid.

4 Claims, 3 Drawing Sheets

U.S. PATENT DOCUMENTS

| | | | | |
|---|---|---|---|---|
| 5,061,435 A | * | 10/1991 | Singh et al. | 376/298 |
| 5,517,594 A | * | 5/1996 | Shah et al. | 392/416 |
| 5,593,642 A | * | 1/1997 | DeWitt et al. | 422/131 |
| 6,029,157 A | * | 2/2000 | Mihatsch | 706/15 |
| 6,175,409 B1 | * | 1/2001 | Nielsen et al. | 506/12 |
| 6,607,569 B1 | * | 8/2003 | Namiki et al. | 44/903 |
| 6,647,342 B2 | * | 11/2003 | Iglesia et al. | 702/22 |
| 6,862,331 B2 | * | 3/2005 | Kato et al. | 376/381 |
| 7,150,994 B2 | * | 12/2006 | Bergh et al. | 436/37 |
| 7,463,937 B2 | * | 12/2008 | Korchinski | 700/31 |
| 7,771,519 B2 | * | 8/2010 | Carolan et al. | 96/7 |
| 2002/0042140 A1 | * | 4/2002 | Hagemeyer et al. | 436/34 |
| 2002/0045265 A1 | * | 4/2002 | Bergh et al. | 436/37 |
| 2002/0048536 A1 | * | 4/2002 | Bergh et al. | 422/130 |
| 2004/0096391 A1 | | 5/2004 | Franz et al. | |
| 2004/0219079 A1 | * | 11/2004 | Hagen et al. | 422/194 |
| 2007/0100475 A1 | * | 5/2007 | Korchinski | 700/28 |
| 2008/0031800 A1 | | 2/2008 | Franz et al. | |
| 2008/0081232 A1 | * | 4/2008 | Kuwata et al. | 429/19 |

FOREIGN PATENT DOCUMENTS

| | | | |
|---|---|---|---|
| EP | 1378488 A2 | 1/2004 | |
| EP | 1378488 A3 | 3/2004 | |
| JP | 2008-208005 | 9/2008 | |
| KR | 1020040004163 | 1/2004 | |

OTHER PUBLICATIONS

Kesseli et al. "Conceptual Design for a High-temperature Gas Loop Test Facility", 2006.*

Inagaki et al. "R&D on high temperature components", Nuclear Engineering and Design 233 (2004) 211-223.*

Takeda et al. "Indirect air cooling techniques for control rod drives in the high temperature engineering test reactor", Nuclear Engineering and Design 223 (2003) 25-40.*

Song et al. "Preliminary Design Analysis of a Hot Gas Duct for the NHDD Program at Korea", Advanced Materials Research vols. 33-37 (2008) pp. 1227-1232.*

Shiozawa et al. "Overview of HTTR design features", Nuclear Engineering and Design 233 (2004) 11-21.*

D. M. Mceligot, et al., Internal Low Reynolds-Number Turbulent and Transitional Gas Flow with Heat Transfer, Journal of Heat Transfer, May 1966, pp. 239-245.

International Search Report dated Oct. 29, 2009 for International Application No. PCT/KR2009/001027.

* cited by examiner

METHOD FOR DESIGNING CONCENTRIC AXIS DOUBLE HOT GAS DUCT FOR VERY HIGH TEMPERATURE REACTOR

CROSS-REFERENCE TO RELATED APPLICATION

This application is the National Stage of International Application No. PCT/KR2009/001047, filed Mar. 3, 2009 and claims the benefit of priority under 35 U.S.C. §119 from Korean Patent Application No. 10-2008-0100510 filed on Oct. 14, 2008, the contents of which are incorporated herein by reference.

BACKGROUND FIELD

Aspects of the present invention relate to a method of designing a coaxial dual-tube-type hot gas duct for a very-high-temperature reactor.

DISCUSSION OF THE BACKGROUND

Producing hydrogen using the heat of a very-high-temperature reactor (VHTR) is being researched in many countries around the world, including Korea. In a nuclear hydrogen generation system, such as the Korean hydrogen production research program, the idea of decomposing water to produce hydrogen, using very high temperature (about 950° C.) helium gas obtained from a VHTR and an iodine-sulfur thermo-chemical process, is being taken into consideration.

Helium gas minimizes the radioactive transmission to a primary loop of the nuclear hydrogen system, during normal operation, because it is an inert gas. Helium also improves the stability of the system, because problems associated with gaseous phase transitions and water-metal reactions do not occur. Further, because a Brayton cycle is possible, helium can increase the thermal and economical efficiencies of a system. In designing the Brayton cycle, an indirect-type heat exchange is possible, based on an intermediate heat exchanger (IHX) providing a connection between primary and secondary loops.

Figure 1:
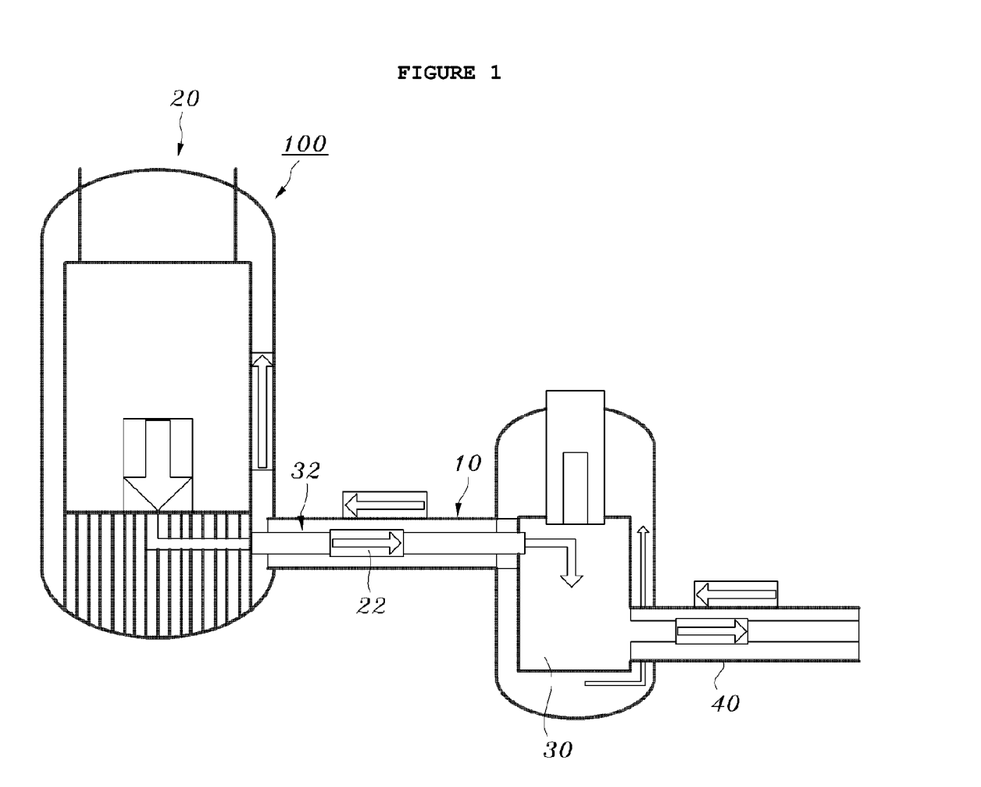
FIG. 1 shows a conventional nuclear hydrogen system using a very-high-temperature reactor.
Figure 2:
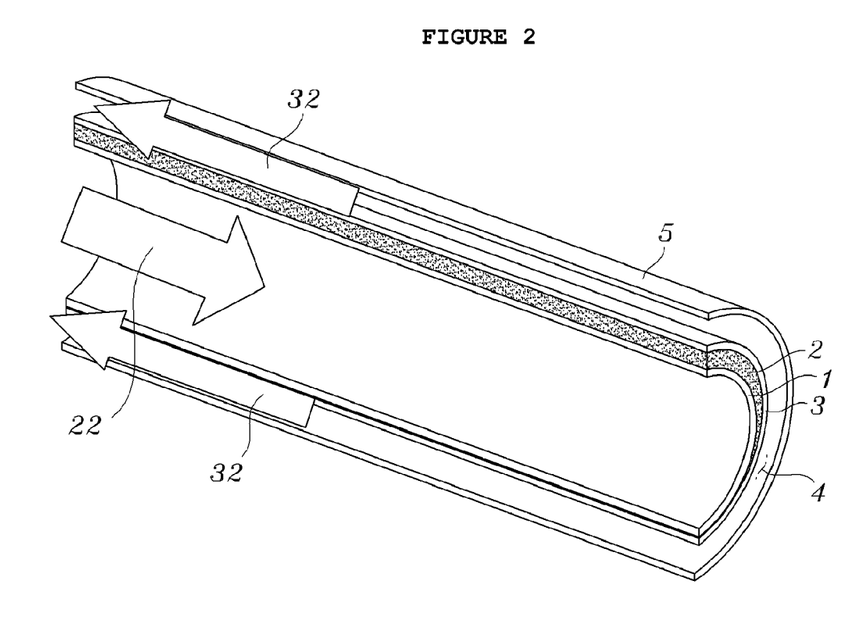
FIG. 2 is a cutaway perspective view showing the coaxial dual-tube type hot gas duct of FIG. 1.

A nuclear hydrogen system 100 will be briefly described with reference to FIG. 1. The nuclear hydrogen system 100 includes at least two hot gas ducts (HGDs) 10 and 40, and a single IHX 30. In detail, the nuclear hydrogen system 100 includes a primary HGD 10 located between a VHTR 20 and the IHX 30, and a secondary HGD 40 located between the IHX 30 and an $SO_3$ decomposer (not shown). Here, for the primary HGD 10, a coaxial dual-tube structure, such as that shown in FIG. 2, is advantageous in terms of thermal expansion and structural strength, and is considered to be a good candidate. In the case of the secondary HGD 40, due to the considerable distance between the IHX 30 and a hydrogen plant, the thermal expansion acts as an important design factor, and thus, a single-tube structure other than the coaxial dual-tube structure may be used.

In the nuclear hydrogen system 100, very high temperature (about 950° C.) helium gas 22 generated at the VHTR 20 flows into a liner tube 1 in the center of the primary HGD 10. The liner tube 1 is a gas moving passage between the VHTR 20 and the IHX 30. A first insulator 2 is disposed around the liner tube 1, and an inner tube 3 is disposed around the first insulator 2. Helium gas 32 of a low temperature (about 490° C.), which was cooled by heat exchange of the IHX 30, flows into an annular space 4, between the inner tube 3 and an HGD pressure tube 5, and then flows back to the VHTR 20 (see FIG. 2).

Figure 3:
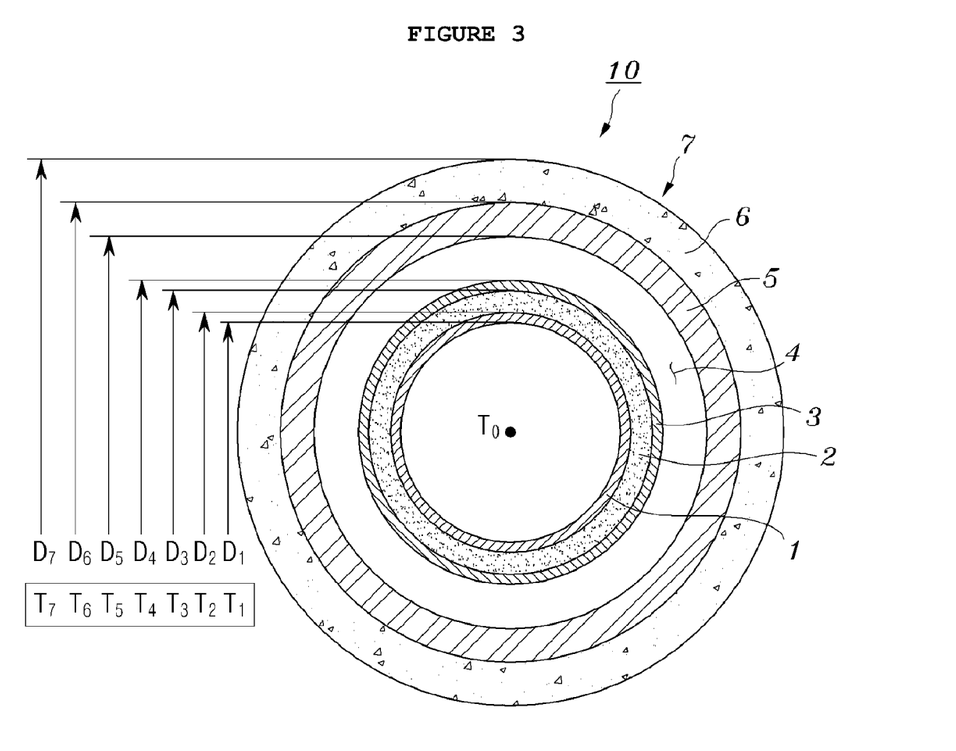
FIG. 3 is a widthwise cross-sectional view showing the coaxial dual-tube type hot gas duct of FIG. 1.

FIG. 3 is a detailed cross-sectional view of the coaxial dual-tube-type primary HGD 10. The coaxial dual-tube-type primary HGD 10 is configured so that a liner tube 1, a first insulator 2, an inner tube 3, an HGD pressure tube 5, and a second insulator 6 are coaxially disposed, in that order. The outside of the second insulator 6 is cooled by air 7. As described above, the very-high-temperature helium gas 22 generated at the VHTR 20 flows into the liner tube 1, and the low-temperature helium gas 32 cooled by the heat exchange of the IHX 30 flows into the annular space 4 between the inner tube 3 and the HGD pressure tube 5, in a direction opposite the flow of the very-high-temperature helium gas 22.

In FIG. 3, the diameters of components constituting the primary HGD 10 are indicated, and are arranged as follows:
- $D_1$=Inner diameter of the liner tube 1;
- $D_2$=Outer diameter of the liner tube 1=Inner diameter of the first insulator 2;
- $D_3$=Outer diameter of the first insulator 2=Inner diameter of the inner tube 3;
- $D_4$=Outer diameter of the inner tube 3=Inner diameter of the annular space 4;
- $D_5$=Outer diameter of the annular space 4=Inner diameter of the HGD pressure tube 5;
- $D_6$=Outer diameter of the HGD pressure tube 5=Inner diameter of the second insulator 6; and
- $D_7$=Outer diameter of the second insulator 6=Outer diameter of the primary HGD 10.

The temperatures of parts corresponding to $D_1$ to $D_7$ are indicated by $T_1$ to $T_7$, and $T_0$ represents the temperature of the very-high-temperature helium gas 22 at the center of the liner tube 1.

The primary HGD 10, having the above-mentioned coaxial dual-tube structure, is used under very-high-temperature medium pressure conditions (7.0 MPa), for a long period, and is subjected to thermal expansion caused by the flow of the very high temperature (950° C.) and the lower temperature (490° C.) helium gas, temperature and pressure cycles, and so on. As such, the primary HGD 10 must be designed as a structure capable of withstanding these conditions. Particularly, in the primary HGD 10 shown in FIG. 3, it is important to properly design the liner tube 1, the inner tube 3, and the annular space 4. The dimensions of the main parts of the primary HGD 10, i.e. the inner (or outer) diameter and thicknesses of each tube, are designed as follows.

First, the inner diameter $D_1$ of the liner tube 1 is obtained from a flow cross-sectional area A, which is calculated by predicting output of the VHTR 20 and an average flow rate of the helium gas, using data of a power plant to be designed, and applying the obtained results to Expression 1 for heat output and Expression 2 for a continuous equation.

$$Q^* = \dot{m} C_p \Delta T^* \qquad [\text{Expression 1}]$$

$$\dot{m} = \rho A V \qquad [\text{Expression 2}]$$

The symbols used in Expressions 1 and 2 are defined as follows:
- $Q^*$: Heat output;
- $\dot{m}$: Mass flow rate;
- $C_p$: Specific heat;
- $\Delta T^*$: Temperature difference of helium gas at the inflow and outflow ports of the VHTR;
- $\rho$: Density of the helium gas;
- A: Flow cross-sectional area ($=\pi D_1^2/4$); and
- V: Average flow velocity of the helium gas.

Next, the outer diameter $D_2$ of the liner tube 1 is obtained, by adding the thickness $t_1$ of the liner tube 1 to the inner diameter $D_1$ of the liner tube 1. The thickness $t_1$ of the liner tube 1 is obtained from an ultimate stress value σ described in the design code, and also from Expression 3 below, which is related to cylindrical stress depending on both the inner diameter $D_1$ of the liner tube 1 and the pressure $P_0$ of the second insulator 2, or pressure loss P* in the event of an accident (e.g. ASME Boiler and Pressure Vessel Code, Section III, Division 1, Subsection ND-Class 3 Components, 1993, US NRC Standard Review Plan, Chapter 3.7.2., 1985, etc.).

$$\sigma = \frac{P_0 D_1}{2t_1} \text{ or } \sigma = \frac{P^* D_1}{2t_1} \qquad \text{[Expression 3]}$$

The first insulator 2 does not substantially support the coaxial dual-tube structure. As such, a thickness $t_2$ of the first insulator 2 is determined after taking into consideration of the quantity of heat transfer required for the design and the thermal conductivity of an insulating material. Thus, both the outer diameter $D_2$ of the liner tube 1 and the thickness $t_2$ of the first insulator 2 determine the inner diameter $D_3$ of the inner tube 3.

A thickness $t_3$ of the inner tube 3 is obtained from the ultimate stress σ described in the design code and also from Expression 4 below, which is related to a cylindrical stress depending on both the inner diameter $D_3$ of the inner tube 3 obtained above and the pressure loss P* in the event of an accident (e.g. ASME Boiler and Pressure Vessel Code, Section III, Division 1, Subsection ND-Class 3 Components, 1993, etc.), and the outer diameter $D_4$ of the inner tube 3 comes from the obtained result.

$$\sigma = \frac{P^* D_3}{2t_3} \qquad \text{[Expression 4]}$$

A cross-sectional area of the annular space 4, in which the low-temperature helium gas 32 flows, can be obtained by using a heat balance model. Here, the relation of a heat balance model for obtaining the cross-sectional area of the annular space 4 is given by Expression 5 below.

$$\begin{aligned}
Q &= q \cdot \pi \cdot D_7 \qquad \text{[Expression 5]}\\
&= h_{He\text{-}Hot} \cdot \pi \cdot D_1 \cdot (T_0 - T_1)\\
&= \frac{2\pi k_{Liner\ Tube}}{\ln(D_2/D_1)} \cdot (T_1 - T_2)\\
&= \frac{2\pi k_{Insulation\text{-}1}}{\ln(D_3/D_2)} \cdot (T_2 - T_3)\\
&= \frac{2\pi k_{Inner\ Tube}}{\ln(D_4/D_3)} \cdot (T_3 - T_4)\\
&= h_{He\text{-}Cold} \cdot \pi \cdot D_4 \cdot (T_4 - T_5)\\
&= \frac{2\pi k_{HG\ Dpress.Tube}}{\ln(D_6/D_5)} \cdot (T_5 - T_6)\\
&= \frac{2\pi k_{Insulation\text{-}2}}{\ln(D_7/D_6)} \cdot (T_6 - T_7)\\
&= h_{Air} \cdot \pi \cdot D_7 \cdot (T_7 - T_{Air})
\end{aligned}$$

The symbols used in Expression 5 are defined as follows:
Q: Heat flux per unit length;
$h_{He\text{-}Hot}$: Heat transfer coefficient on the inner surface of the liner tube;
$h_{He\text{-}cold}$: Heat transfer coefficient on the outer surface of the inner tube;
$h_{Air}$: Heat transfer coefficient on the surface of the second insulator;
$k_{Liner\ tube}$: Thermal conductivity of the liner tube;
$k_{Insulation\text{-}1}$: Effective thermal conductivity of the first insulator;
$k_{Inner\ tube}$: Thermal conductivity of the inner tube;
$k_{HGD\ press.\ tube}$: Thermal conductivity of the HGD pressure tube; and
$k_{insulation\text{-}2}$: Effective thermal conductivity of the second insulator.

Further, the heat transfer coefficient of the annular space 4 in Expression 5 uses a value obtained from a corrected Dittus-Boelter model (McEligot D. M., Ormand L. W., and Perkins H. C., 1966, "Internal Low Reynolds Number Turbulent and Transitional Gas Flow with Heat Transfer", Journal of Heat Transfer, Vol. 88, pp. 239-245). The heat transfer coefficient is given as in Expression 6 below.

$$Nu = 0.021 Re^{0.8} Pr^{0.4}, \qquad \text{[Expression 6]}$$

wherein Nu, Re, and Pr are the Nusselt number, the Reynolds number, and the Prandtl number respectively, and are defined as follows.

$$Nu = \frac{h D_H}{k} \qquad \text{[Expression 7]}$$

$$Re = \frac{\rho V D_H}{\mu} \qquad \text{[Expression 8]}$$

$$Pr = \frac{C_p \mu}{k} \qquad \text{[Expression 9]}$$

The symbols used in Expressions 7, 8 and 9 are defined as follows:
h: Heat transfer coefficient;
$D_H$: Hydraulic diameter;
k: Thermal conductivity; and
μ: Dynamic viscosity.

A temperature drop $(T_4 - T_5)$ at the annular space 4 is set to be ΔT, and the hydraulic diameter $D_H$ at the annular space 4 and the outer diameter $D_4$ of the inner tube 3 are arranged with reference to Expressions 2, 5 through 9, as in the relation below.

$$D_H^5 (2D_4 + D_H)^4 D_4^{-5} = C_0 \left(\frac{4\dot{m}}{\pi \rho}\right)^4 \Delta T^5, \qquad \text{[Expression 10]}$$

wherein $$C_0 = \left(\frac{\pi C_1}{Q}\right),$$

and $C_1 = 0.021\ k\rho^{0.8}\mu^{-0.8}Pr^{0.4}$, and both $C_0$ and $C_1$ are constants.

Thus, when the hydraulic diameter $D_H$ is obtained from Expression 10, the outer diameter $D_5$ of the annular space 4 (equal to the inner diameter of the HGD pressure tube 5) can be obtained from the relation of $D_H = D_5 - D_4$.

Finally, thicknesses of the HGD pressure tube 5 and the second insulator 6 are determined. Since the thickness of the HGD pressure tube 5 is not related to the flow cross-sectional area of the helium gas, the thickness of the HGD pressure tube 5 has only to be determined to yield the predetermined design strength. Further, since the second insulator 6 is not configured to support the structure of the primary HGD 10, the thickness of the second insulator 6 needs only to take into consideration the heat-transfer quantity desired between the second insulator 6 and the external air 7, as well as the thermal conductivity of an insulating material.

Further, the method of designing the coaxial dual-tube structure has been described on the basis of the primary HGD 10. However, the method may be equally applied when designing the secondary HGD 40, in a coaxial dual-tube structure other than a single-tube structure.

In the related art as described above, the hydraulic diameter $D_H$ of the annular space 4 is determined using the relation of balance model, between the very-high-temperature helium gas 22 and the low-temperature helium gas 32, both of which flow in opposite directions. However, since the method of design in the related art takes into consideration only the heat balance between the very-high-temperature helium gas 22 and the low-temperature helium gas 32, it can present only basic design values that allow the primary HGD 10 to maintain a thermally stable state, and does not take into consideration a dynamically stable state, in which a flow induced vibration caused by the counter current helium gas flow is minimized, at the primary HGD 10.

Thus, the method of designing the primary HGD 10, and particularly the method of designing the annular space 4 never ensures the structural soundness of the primary HGD 10, because the flow induced vibration is applied to the primary HGD 10 of the nuclear hydrogen system 100, which must be operated continuously, for a long period of time.

SUMMARY OF THE INVENTION

Accordingly, the present invention has been made in an effort to solve the problems occurring in the related art, and the present invention is intended to provide a method of designing a coaxial dual-tube type hot gas duct for a very-high-temperature reactor, in which, when designing an annular space of the hot gas duct having a dual-tube configuration, a relationship between a heat balance model and a condition of equalizing one selected from average flow velocities, flow rates, and hydraulic heads of helium gas flowing to a very-high-temperature region and helium gas flowing to a low-temperature region, are taken under consideration. Accordingly, it is possible to minimize flow-induced vibrations caused by the flow of the helium gas.

According to one aspect of the present invention, there is provided a method of designing a coaxial dual-tube type hot gas duct (HGD) for a very-high-temperature reactor (VHTR), in which the hot gas duct includes: a liner tube in which very-high-temperature helium gas flows; a first insulator disposed around the liner tube; an inner tube disposed around the first insulator; an HGD pressure tube disposed around the inner tube and spaced apart from the inner tube by an annular space; that is a space in which low-temperature helium gas flows in a counter-current direction to that of the very-high-temperature helium gas, and a second disposed around the HGD pressure tube and exposed to air on an outer surface thereof. In the annular space, a low-temperature helium gas flows in the counter current direction. The liner tube, the first insulator, and the inner tube have the same axis as the HGD pressure tube and the second insulator. The method comprises the following operations.

A first operation of determining an inner diameter of the liner tube, based on the output of the VHTR, an average flow velocity of the helium gas, and the Expressions below:

$$Q^* = \dot{m} C_p \Delta T^*,$$

$$\dot{m} = \rho A V,$$

wherein $Q^*$ is a heat output of the VHTR; $\dot{m}$ is a mass flow rate; $C_p$ is a specific heat; $\Delta T^*$ is a temperature difference of helium gas at the inflow and outflow ports of the VHTR; $\rho$ is the density of the helium gas; A is flow cross-sectional area ($= \pi D_1^2/4$); and V is an average flow velocity of the helium gas.

A second operation includes determining the thickness of the liner tube using an ultimate stress value $\sigma$ and the Expressions below, which are related to a circumferential stress depending on both the inner diameter of the liner tube and the pressure of the second insulator, or pressure loss in the event of an accident. Then, an outer diameter of the liner tube is calculated by adding the determined thickness of the liner tube to the inner diameter of the liner tube determined in the first operation.

$$\sigma = \frac{P_0 D_1}{2 t_1} \text{ or } \sigma = \frac{P^* D_3}{2 t_1}$$

In a third operation, a thickness of the first insulator and an inner diameter of the inner tube are determined based on a predetermined amount of heat transfer and thermal conductivity of an insulator used. Then, in a fourth operation, a thickness of the inner tube is determined by using the ultimate stress value $\sigma$ and the Expression below, which is related to a circumferential stress depending on both the determined inner diameter of the inner tube and a pressure loss that occurs in the event of an accident. Then, an outer diameter of the inner tube is calculated by adding the thickness of the inner tube to the calculated inner diameter of the inner tube.

$$\sigma = \frac{P^* D_3}{2 t_3}$$

In a fifth operation, a temperature drop ($T_4$-$T_5$) at the annular space is set to be $\Delta T$. A hydraulic diameter of the annular space is determined. The hydraulic diameter satisfies a condition of equalizing one selected from average flow velocities, flow rates, and hydraulic heads, of the very-high-temperature helium gas and the low-temperature helium gas. The hydraulic diameter also satisfies the Expression below, which is related to a heat balance between the hydraulic diameter of the annular space and the outer diameter of the inner tube.

$$D_H^5 (2 D_4 + D_H)^4 D_4^{-5} = C_0 \left( \frac{4 \dot{m}}{\pi \rho} \right)^4 \Delta T^5$$

wherein $$C_0 = \left( \frac{\pi C_1}{Q} \right),$$

$C_1 = 0.021 \, k \rho^{0.8} \mu^{-0.8} \, Pr^{0.4}$, $C_0$ and $C_1$ are constants, k is the thermal conductivity, $\mu$ is the dynamic viscosity, and Pr is the Prandtl number, In a sixth step of operation, a thickness of the HGD pressure tube is determined, such that it has predetermined design strength. Then, in a seventh operation, a thickness of the second insulator is calculated, based on an amount of heat transfer to the air and the thermal conductivity of an insulator used.

Here, the equalization of the average flow velocities of the very-high-temperature helium gas and the low-temperature helium gas may be performed to satisfy the Expression below, and may simultaneously satisfy the Expression of the fifth operation, when determining the hydraulic diameter of the annular space.

$$D_H = -D_4 + \left(D_4^2 + \frac{\rho_{hot}}{\rho_{cold}} D_1^2\right)^{0.5}$$

Further, the equalizing of the flow rates of the very-high-temperature helium gas and the low-temperature helium gas may be performed to satisfy the Expression below, and may simultaneously satisfy the Expression of the fifth operation, when determining the hydraulic diameter of the annular space.

$$D_H = -D_4 + (D_4^2 + D_1^2)^{0.5}$$

In addition, the equalizing of the hydraulic heads may be performed so as to satisfy the Expression below, and may simultaneously satisfy the Expression of the fifth operation, when determining the hydraulic diameter of the annular space.

$$D_H = -D_4 + \left\{D_4^2 + \left(\frac{\rho_{hot}}{\rho_{cold}}\right)^{0.5} D_1^2\right\}^{0.5}$$

DETAILED DESCRIPTION OF THE EXEMPLARY EMBODIMENTS

Reference will now be made in greater detail to exemplary embodiments of the present invention, with reference to the accompanying drawings. In the present disclosure, the description of elements similar to the above-mentioned related art will be omitted, so as not to obscure the subject matter of the present invention. Further, the technical terms and symbols used to describe the related art will also be similarly used to describe the exemplary embodiments of the present invention.

Aspects of the present invention are directed to a method of designing a coaxial dual-tube-type hot gas duct (HGD) 10 for a very-high-temperature reactor (VHTR) 100. As shown in FIGS. 1-3, the hot gas duct 10 includes: a liner tube 1 in which very-high-temperature helium gas 22 flows; a first insulator 2 disposed around the liner tube 1; an inner tube 3 disposed around the first insulator 2; an HGD pressure tube 5 spaced apart from the inner tube 3 by an annular space 4; and a second insulator 6 disposed around the HGD pressure tube 5 and exposed to air 7 on an outer surface thereof. The annular space 4 is a space in which low-temperature helium gas 32 flows in a counter-current direction to that in which the very-high-temperature helium gas 22 flows. The liner tube 1, the first insulator 2, and the inner tube 3 have the same axis as the HGD pressure tube 5 and the second insulator 6.

The method comprises a first operation of determining an inner diameter $D_1$ of the liner tube 1, based on an output of the VHTR, an average flow velocity of the helium gas through the liner tube 1, and the Expressions below:

$$Q^* = \dot{m} C_p \Delta T^*$$

$$\dot{m} = \rho A V,$$

wherein $Q^*$: heat output of the VHTF; $\dot{m}$: mass flow rate of helium through the liner tube 1; $C_p$: specific heat of the helium gas in the liner tube 1; $\Delta T^*$: temperature difference of the helium gas at the inflow and outflow ports of the VHTR; $\rho$: density of the helium gas in the liner tube 1; A: flow cross-sectional area of the liner tube 1 ($=\pi D_1^2/4$); and V: average flow velocity of the helium gas through the liner tube.

In a second operation, a thickness $t_1$ of the liner tube 1 is determined using an ultimate stress value $\sigma$ and one of the Expressions below, which are related to a cylindrical stress dependent upon the inner diameter $D_1$ of the liner tube 1 and the pressure $P_0$ of the second insulator 2 (or pressure loss $P^*$ in the event of an accident). An outer diameter $D_2$ of the liner tube 1 is calculated by adding the determined thickness $t_1$ of the liner tube 1 to the previously determined inner diameter $D_1$ of the liner tube 1.

$$\sigma = \frac{P_0 D_1}{2 t_1} \text{ or } \sigma = \frac{P^* D_1}{2 t_1}$$

In a third operation, a thickness $t_2$ of the first insulator 2 and an inner diameter $D_3$ of the inner tube 3 are determined, based on a predetermined amount of heat transfer, and the thermal conductivity of the first insulator 2.

In a fourth operation, a thickness $t_3$ of the inner tube 3 is determined using the ultimate stress value $\sigma$ and the Expression below, which is related to a cylindrical stress depending on the determined inner diameter $D_3$ of the inner tube 3 and the pressure loss $P^*$ in the event of an accident. An outer diameter $D_4$ of the inner tube 3 is determined by adding the thickness $t_3$ of the inner tube 3 to the inner diameter $D_3$ of the inner tube 3.

$$\sigma = \frac{P^* D_3}{2 t_3}$$

In a fifth operation, a temperature drop $(T_4 - T_5)$ at the annular space 4 is set to be $\Delta T$. A hydraulic diameter $D_H$ of the annular space 4 is determined that: equalizes one selected from the average flow velocities, the flow rates, and the hydraulic heads, of the very-high-temperature helium gas 22 and the low-temperature helium gas 32; and also satisfies the Expression below, which is related to a heat balance between the hydraulic diameter $D_H$ of the annular space 4 and the outer diameter $D_4$ of the inner tube 3.

$$D_H^5(2D_4 + D_H)^4 D_4^{-5} = C_0 \left(\frac{4\dot{m}}{\pi \rho}\right)^4 \Delta T^5 \qquad 5$$

wherein $$C_0 = \left(\frac{\pi C_1}{Q}\right),$$

$C_1 = 0.021 \, k\sigma^{0.8} \mu^{-0.8} Pr^{0.4}$, $C_0$ is a constant, $C_1$ is a constant, $k$ is the thermal conductivity of the annular space, $\mu$ is the dynamic viscosity of the helium gas in the annular space, and Pr is the Prandtl number, In a sixth operation, a thickness of the HGD pressure tube 5 is set, so as to have a predetermined design strength. Finally, in a seventh operation, a thickness of the second insulator 6 is determined, based on the amount of heat to be transferred to the air 7, and the thermal conductivity of the second insulator 6.

Here, the equalizing of the average flow velocities of the very-high-temperature helium gas 22 and the low-temperature helium gas 32 is performed so as to simultaneously satisfy the Expression below and the Expression of the fifth operation, when determining the hydraulic diameter $D_H$ of the annular space 4.

$$D_H = -D_4 + \left(D_4^2 + \frac{\rho_{hot}}{\rho_{cold}} D_1^2\right)^{0.5}$$

Further, the equalizing of the flow rates of the very-high-temperature helium gas 22 and the low-temperature helium gas 32, in the fifth operation, simultaneously satisfies the Expression of the fifth operation and Expression below, when determining the hydraulic diameter $D_H$ of the annular space 4.

$$D_H = -D_4 + (D_4^2 + D_1^2)^{0.5}$$

In addition, the equalizing the hydraulic heads of the very-high-temperature helium gas 22 and the low-temperature helium gas 32, in the fifth operation, simultaneously satisfies Expression of the fifth operation and the Expression below, when determining the hydraulic diameter $D_H$ of the annular space 4.

$$D_H = -D_4 + \left\{D_4^2 + \left(\frac{\rho_{hot}}{\rho_{cold}}\right)^{0.5} D_1^2\right\}^{0.5}$$

Aspects of the present invention present a new design method that combines any of a constant flow velocity (CFV) model, a constant flow rate (CFR) model, or a constant hydraulic head (CHH) model, with the conventional heat balance model (HB), when designing an annular space 4 of the coaxial dual-tube type primary HGD 10. As such, that heat balance between the very-high-temperature helium gas 22 and the low-temperature helium gas 32, as well as the dynamic balance of a coaxial dual-tube type primary hot gas duct (HGD) 10, are taken into consideration. The three models consider a velocity component V, which is an attribute of a flowing fluid (helium gas), from three different viewpoints.

As for the CFV model, the structure of the annular space 4 is designed by setting an average flow velocity of the very-high-temperature helium gas 22 flowing in the liner tube 1 to be equal to that of the low-temperature helium gas 32 flowing in the annular space 4. In other words, the expression, $V_{hot} = V_{cold}$, which is a constant velocity condition, is combined with Expression 2 described above. Thereby, the following relation formula is derived.

$$D_H = -D_4 + \left(D_4^2 + \frac{\rho_{hot}}{\rho_{cold}} D_1^2\right)^{0.5} \qquad \text{[Expression 11]}$$

Thus, in the CFV model, the annular space 4 is designed so as to simultaneously satisfy Expression 11 and Expression 10, which are related to the heat balance.

As for the CFR model, the structure of the annular space 4 is designed by setting a flow rate of the very-high-temperature helium gas 22 flowing in a liner tube 1 to be equal to that of the low-temperature helium gas 32 flowing in the annular space 4. In other words, the expression, $(\rho V)_{hot} = (\rho V)_{cold}$, which states that the flow rate is constant, is combined with Expression 2 described above. Thereby, the following Expression 12 is derived.

$$D_H = -D_4 + (D_4^2 + D_1^2)^{0.5} \qquad \text{[Expression 12]}$$

Thus, in the CFR model, the annular space 4 is designed so as to simultaneously satisfy Expression 12 and Expression 10, which are related to the heat balance.

Finally, as for the CHH model, the structure of the annular space 4 is designed by adding the condition that, if a dynamic pressure of the very-high-temperature helium gas 22 flowing in a liner tube 1 is the same as that of the low-temperature helium gas 32 flowing in the annular space 4, the corresponding hydraulic heads are equal to each other, when there is no static pressure difference between a region where the very-high-temperature helium gas 22 flows and a region where the low-temperature helium gas 32 flows. In other words, the expression, $(\rho V^2)_{hot} = (\rho V^2)_{cold}$, which is a constant dynamic pressure condition, is combined with Expression 2 described above. Thereby, the following formula Expression 13 is derived.

$$D_H = -D_4 + \left\{D_4^2 + \left(\frac{\rho_{hot}}{\rho_{cold}}\right)^{0.5} D_1^2\right\}^{0.5} \qquad \text{[Expression 13]}$$

Thus, in the CHH model, the annular space 4 must be designed so as to simultaneously satisfy Expression 13 and Expression 10, which relate to the heat balance.

As described above, the description of the exemplary embodiments of the present invention places emphasis on a special method of designing the annular space 4 of the primary HGD 10 having the coaxial dual-tube structure. The structures of the liner tube 1, first insulator 2, inner tube 3, HGD pressure tube 5, and second insulator 6, other than their relationships to the annular space 4, are similar to those of the related art. Further, the method of designing the coaxial dual-tube structure of the present invention can be equally applied to designing the primary HGD 10, as well as the secondary HGD 40, in a coaxial dual-tube structure, rather than in a single-tube structure.

The three methods of designing the annular space 4, according to aspects of the present invention, have been described. In detail, the addition of one condition selected from the CFV model, the CFR model, and the CHH model, to the HB model, makes it possible to design a coaxial dual-tube type HGD having a structure insensitive to flow induced vibrations caused by the counter current flow of a fluid (helium gas). It can be understood by a person skilled in the art that this can be variously modified or combined within a scope of the technical spirit of the present invention.

According to the present invention, when determining the outer diameter of the inner tube and the inner diameter of the pressure tube, by which the annular space of the HGD is defined, one selected from the hydraulic heads, flow rates and dynamic pressures of the very-high-temperature helium gas flowing to the very-high-temperature region, and the low-temperature helium gas flowing to the low-temperature region being equal is taken into consideration, as well as is the relation of the heat balance model. Thereby, it is possible to minimize the flow induced vibrations caused by the fluid flow, and thus, to expect a wide application in the chemical field, etc. including the field of nuclear hydrogen systems.

The invention claimed is:

1. A method of designing a coaxial dual-tube-type hot gas duct (HGD) for a very-high-temperature reactor (VHTR), the hot gas duct comprising: a liner tube in which helium gas flows at a first temperature; a first insulator disposed around the liner tube; an inner tube disposed around the first insulator; an HGD pressure tube disposed around the inner tube and separated from the inner tube by an annular space, through which helium gas flows at a second temperature that is lower that the first temperature, in a counter current direction to the flow of the helium gas through the liner tube; and a second insulator disposed around the HGD pressure tube and having an external surface that is exposed to ambient air, the method comprising:
determining an inner diameter ($D_1$) of the liner tube, based on the output of the VHTR, an average flow velocity of the helium gas through the liner tube, and the following Expression 1 and Expression 2:

$$Q^* = \dot{m} C_p \Delta T^* \quad \text{(Expression 1)}$$

$$\dot{m} = \rho A V \quad \text{(Expression 2)},$$

wherein $Q^*$ is the heat output of the VHTR, $\dot{m}$ is a mass flow rate of the helium gas though the liner tube, $C_p$ is the specific heat capacity of the helium gas, $\Delta T^*$ is a temperature difference of the helium gas at the inflow and outflow ports of the VHTR, $\rho$ is the density of the helium gas, A is a flow cross-sectional area ($=\pi D_1^2/4$) of the liner tube, and V is an average flow velocity of the helium gas through the liner tube;
determining a thickness ($t_1$) of the liner tube using an ultimate stress value ($\sigma$) and the following Expression (3A) or Expression (3B):

$$\sigma = \frac{P_0 D_1}{2t_1}, \quad \text{(Expression 3A)}$$

$$\sigma = \frac{P * D_1}{2t_1}, \quad \text{(Expression 3B)}$$

wherein $P_0$ is a pressure of the second insulator, $P^*$ is a pressure level in the liner tube corresponding to an unintended pressure loss;
determining an outer diameter ($D_2$) of the liner tube, by adding the determined thickness ($t_1$) of the liner tube to the determined inner diameter ($D_1$) of the liner tube;
determining a thickness ($t_2$) of the first insulator and an inner diameter ($D_3$) of the inner tube, based on a predetermined amount of heat transfer and the thermal conductivity of the first insulator;
determining a thickness ($t_3$) of the inner tube, using the following Expression 4:

$$\sigma = \frac{P^* D_3}{2t_3}; \quad \text{(Expression 4)}$$

determining an outer diameter ($D_4$) of the inner tube by adding the determined thickness ($t_3$) of the inner tube to the determined inner diameter ($D_3$) of the inner tube;
setting a temperature drop between the temperature of the inner surface of the annular part $T_4$ and an outer surface of the annular part $T_5$ ($T_4$-$T_5$) to be $\Delta T$, and determining a hydraulic diameter ($D_H$) of the annular space that equalizes one selected from the average flow velocities, the flow rates, and the hydraulic heads, of the helium gas flowing through the liner tube and the helium gas flowing through the annular space, and also satisfies the following Expression 5 related to heat balance between the hydraulic diameter ($D_H$) of the annular part (4) and the outer diameter ($D_4$) of the inner tube (3):

$$D_H^5 (2D_4 + D_H)^4 D_4^{-5} = C_0 \left(\frac{4\dot{m}}{\pi \rho}\right)^4 \Delta T^5, \quad \text{(Expression 5)}$$

wherein $$C_0 = \left(\frac{\pi C_1}{Q}\right),$$

$C_1 = 0.021 \, k\rho^{0.8} \mu^{-0.8} Pr^{0.4}$, $C_0$ is a constant, $C_1$ is a constant, k is the thermal conductivity of the annular space, $\mu$ is the dynamic viscosity of the helium gas in the annular space, and Pr is the Prandtl number;
determining a thickness of the HGD pressure tube, so as to impart a predetermined design strength; and
determining a thickness of the second insulator, based on an amount of heat to be transferred to the air and the thermal conductivity of the second insulator.

2. The method as set forth in claim 1, wherein the equalizing of the average flow velocities comprises simultaneously satisfying Expressions 5 and the following Expression 6:

$$D_H = -D_4 + \left(D_4^2 + \frac{\rho_{hot}}{\rho_{cold}} D_1^2\right)^{0.5}, \quad \text{(Expression 6)}$$

wherein,
$\rho hot$ is the density of the helium gas flowing though the liner tube, and
$\rho cold$ is the density of the helium gas flowing though the annular space.

3. The method as set forth in claim 1, wherein the equalizing of the flow rates simultaneously satisfies Expression 5 and the following Expression 7:

$$D_H = -D_4 + (D_4^2 + D_1^2)^{0.5} \quad \text{(Expression 7)}.$$

4. The method as set forth in claim 1, wherein the equalizing of the hydraulic heads simultaneously satisfies Expressions 5 and the following Expression 8:

$$D_H = -D_4 + \left\{D_4^2 + \left(\frac{\rho_{hot}}{\rho_{cold}}\right)^{0.5} D_1^2\right\}^{0.5}, \quad \text{(Expression 8)}$$

wherein,
$\rho hot$ is the density of the helium gas flowing though the liner tube, and
$\rho cold$ is the density of the helium gas flowing though the annular space.

* * * * *